US011908618B2

(12) United States Patent
Arizmendi Zurutuza et al.

(10) Patent No.: US 11,908,618 B2
(45) Date of Patent: Feb. 20, 2024

(54) THERMOELECTRIC ASSEMBLY FOR POWERING ELECTROMAGNETIC VALVES OF A COOKING APPLIANCE

(71) Applicant: ORKLI, S. COOP., Ordizia (ES)

(72) Inventors: Mikel Arizmendi Zurutuza, Ordizia (ES); Marcos Pablo Curto, Hernani (ES)

(73) Assignee: ORKLI, S. COOP., Ordizia (ES)

( * ) Notice: Subject to any disclaimer, the term of this patent is extended or adjusted under 35 U.S.C. 154(b) by 549 days.

(21) Appl. No.: 17/117,556

(22) Filed: Dec. 10, 2020

(65) Prior Publication Data

US 2021/0193358 A1 Jun. 24, 2021

(30) Foreign Application Priority Data

Dec. 19, 2019 (EP) .................................... 19383142
Dec. 19, 2019 (EP) .................................... 19383143

(51) Int. Cl.
*H01F 7/06* (2006.01)
*F24C 3/12* (2006.01)
*H01F 7/08* (2006.01)

(52) U.S. Cl.
CPC ............. *H01F 7/064* (2013.01); *F24C 3/126* (2013.01); *H01F 7/081* (2013.01)

(58) Field of Classification Search
CPC ........... H01F 7/064; H01F 7/081; F24C 3/126
USPC .................................... 126/39 G; 431/75, 80
See application file for complete search history.

(56) References Cited

U.S. PATENT DOCUMENTS 3,534,069 A * 10/1970 Bryan ..................... C07C 46/04 552/296
3,630,648 A * 12/1971 Hulsman ................ F23N 5/102 137/65
3,632,980 A * 1/1972 Hornaday, Jr. ....... F24C 15/101 219/448.11

(Continued)

FOREIGN PATENT DOCUMENTS

DE 2123458 A1 11/1972
DE 2306544 A1 8/1974

(Continued)

OTHER PUBLICATIONS

Extended European Search Report received in EP application No. 19383142.7, dated Jun. 26, 2020 (9 pages).

*Primary Examiner* — Vivek K Shirsat
(74) *Attorney, Agent, or Firm* — Edell, Shapiro & Finnan, LLC

(57) ABSTRACT

A thermoelectric assembly for powering one or more electromagnetic valves of a cooking appliance. According to one embodiment the assembly includes a main current circuit that includes a thermocouple, a cable configured for electrically connecting the thermocouple with an electromagnetic valve, and a transistor connected to the cable and configured for de-energizing the electromagnetic valve. The main current circuit also includes a connection module that includes a power supply connected to the transistor, the power supply having input terminals configured for being connected to an external energy source, a rectifier, and a resistive block connected between one of the input terminals and the rectifier, the resistive block being configured for minimizing the current circulating through the power supply to a value equivalent to the galvanic isolation.

20 Claims, 3 Drawing Sheets

(56) References Cited

U.S. PATENT DOCUMENTS

| | | | | |
|---|---|---|---|---|
| 2006/0275720 | A1 * | 12/2006 | Hotton .................... | F23N 5/102<br>431/66 |
| 2010/0033892 | A1 | 2/2010 | Pianezze | |
| 2019/0078781 | A1 * | 3/2019 | Moro ...................... | F24C 3/126 |

FOREIGN PATENT DOCUMENTS

| | | | |
|---|---|---|---|
| FR | 2217636 | A1 | 9/1974 |
| GB | 1524056 | A | 9/1978 |
| JP | 2004144424 | A | 5/2004 |
| WO | 2019020426 | A1 | 1/2019 |

* cited by examiner

THERMOELECTRIC ASSEMBLY FOR POWERING ELECTROMAGNETIC VALVES OF A COOKING APPLIANCE

CROSS-REFERENCE TO RELATED APPLICATIONS

This application relates to and claims the benefit and priority to each of European Patent Appl. Nos. EP19383142.5 and EP19383143.7, each filed on Dec. 19, 2019.

TECHNICAL FIELD

The present invention relates to a thermoelectric assembly for powering a plurality of electromagnetic valves of a cooking appliance, each electromagnetic valve allowing or preventing the passage of gas to a respective burner of the cooking appliance.

BACKGROUND

Cooking appliances with burners, each of which having associated therewith a thermocouple connected to a respective electromagnetic valve are known in the state of the art, such that when the thermocouple detects the presence of flame in the burner, it generates a thermoelectric current which is capable of keeping the electromagnetic valve energized at a given time, allowing the passage of gas to the corresponding burner.

European Publication No. EP 0288390 A1 furthermore describes electric circuits in which a MOSFET is arranged between the thermocouple and the electromagnetic valve, the MOSFET acting like a switch, such that depending on pre-established parameters, the MOSFET can open the circuit preventing the passage of current to the electromagnetic valve, and therefore causing the electromagnetic valve to close the passage of gas to the burner regardless of the presence of flame in the corresponding burner.

Moreover, powering thermoelectric circuits of this type with power supplies including transformers for galvanically isolating the thermoelectric circuits is also known, as described in U.S. Publication No. 2019/0195507 A1.

SUMMARY

Disclosed is a thermoelectric assembly for powering a plurality of electromagnetic valves of a cooking appliance, each electromagnetic valve being configured for closing the passage of gas to a corresponding burner of the cooking appliance.

The thermoelectric assembly comprises a main current circuit associated with a respective electromagnetic valve, the main current circuit including a thermocouple configured for detecting flame in the corresponding burner, a cable connected to the thermocouple and configured for electrically connecting the thermocouple with the corresponding electromagnetic valve, and a transistor connected to the cable and configured for de-energizing the electromagnetic valve.

The main current circuit includes a connection module comprising a power supply connected to the transistor, input terminals configured for being connected to an external energy source, a rectifier configured for transforming the alternating current of the external energy source into direct current, and a resistive block connected between one of the input terminals and the rectifier and configured for minimizing the current circulating through the power supply to a value equivalent to the galvanic isolation.

A thermoelectric assembly having a main current circuit with a basic and simple power supply is thereby obtained, without having to include a transformer in the power supply for obtaining the required galvanic isolation. The power supply will thus be simpler and more cost-effective, and is therefore integrated in the main current circuit, particularly in the connection module together with the transistor. A main current circuit that is compact, simple, and can be readily connected to the external energy source is thereby obtained.

These and other advantages and features will become evident in view of the drawings and detailed description.

DETAILED DESCRIPTION

Figure 1:
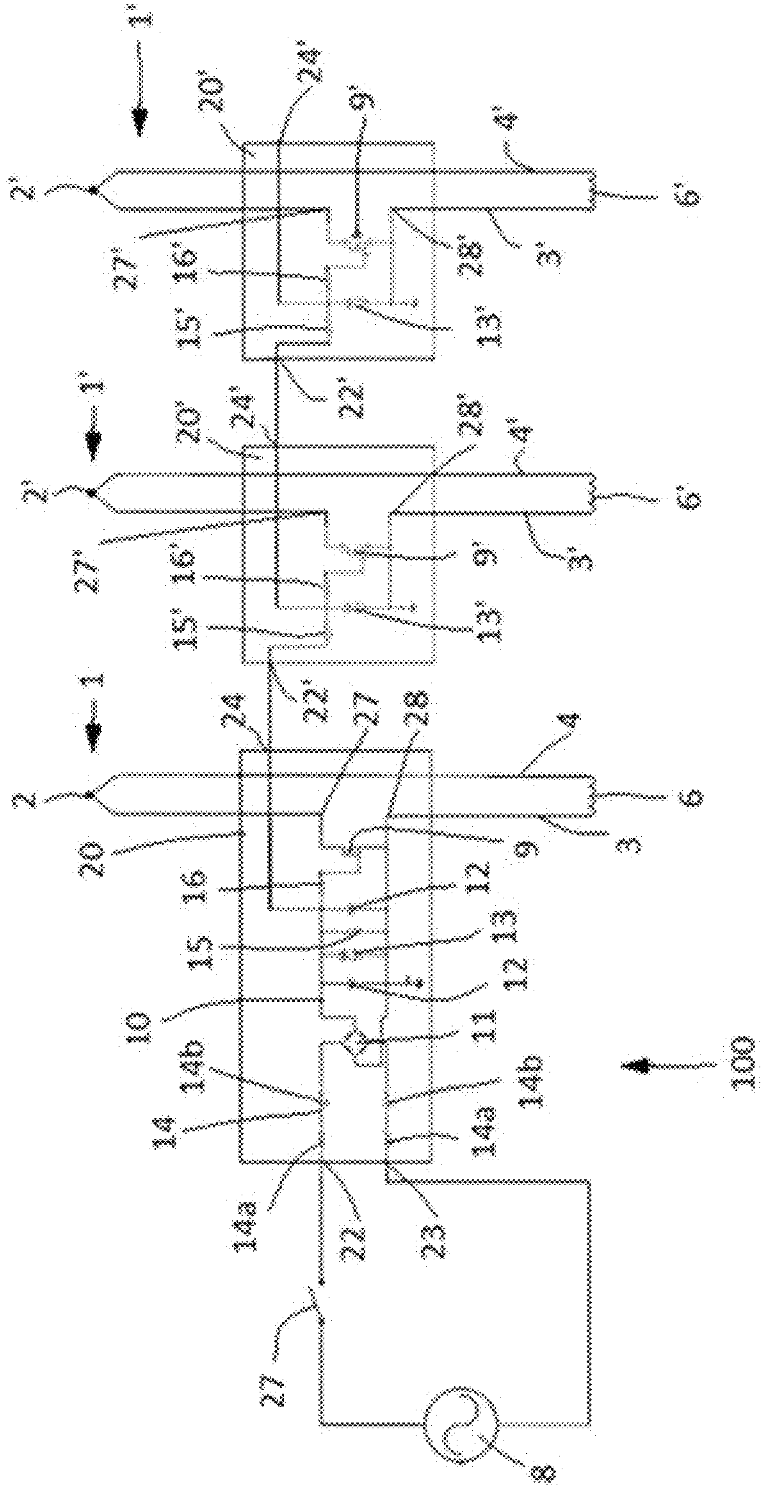
FIG. 1 shows a wiring diagram of a thermoelectric assembly according to one embodiment comprising a main current circuit and additional current circuits.

FIG. 1 shows a thermoelectric assembly 100 according to one embodiment suitable for powering a plurality of electromagnetic valves 6 and 6' of a cooking appliance (not depicted in the drawings), each electromagnetic valve 6 and 6' being configured for closing the passage of gas to a corresponding burner (not depicted in the drawings) of the cooking appliance.

The thermoelectric assembly 100 comprises a main current circuit 1 associated with a respective electromagnetic valve 6. The main current circuit 1 comprises a thermocouple 2 configured for detecting flame in the corresponding burner with cables 3 and 4 connected to the thermocouple 2 and configured for electrically connecting the thermocouple 2 with the corresponding electromagnetic valve 6 through a connector 5, The main current circuit 1 also includes a transistor 9 connected to one of the cables 3 and configured for de-energizing the electromagnetic valve 6. A connection module 20 comprising a power supply 10 is connected to the transistor 9.

The transistor 9 is a field-effect transistor, preferably a MOSFET type transistor. The transistor 9 comprises a port terminal 9*a*, a drain terminal 9*b*, and a source terminal 9*c*, the transistor 9 being connected to the power supply 10 through the port terminal 9*a* and source terminal 9*c*. The transistor 9 behaves like a switch. In particular, when it operates in the cut-off region conduction between the source terminal 9*c* and the drain terminal 9*b* does not occur, so it operates like an open switch regardless of whether or not the thermocouple 2 detects the presence of flame, and therefore the electromagnetic valve is kept de-energized, preventing the passage of gas to the corresponding burner. When the power supply 10 is connected to the external energy source 8, it powers the transistor 9 which operates like a closed switch, the electromagnetic valve is kept energized as long as the thermocouple 2 detects flame in the burner and a thermoelectric current capable of keeping the electromagnetic valve energized is generated. The transistor 9 has two connection terminals 27 and 28, each of which is connected to the cable 3 of the thermocouple 2.

The power supply 10 comprises two input terminals 22 and 23 configured for being connected to the external energy source 8, a rectifier 11 configured for transforming the alternating current of the external energy source 8 into direct current, and a resistive block 14 connected between one of the input terminals 22 and 23 and the rectifier 11, the resistive block 14 being configured for minimizing the current circulating through the power supply 10 to a value equivalent to the galvanic isolation. The resistance of the resistive block 14 is about 2.24 milliohms.

In the embodiment shown in the drawings, the power supply 10 comprises two resistive blocks 14, each of them connected to the corresponding input terminal 22 and 23. Preferably, each resistive block 14 comprises at least two resistors 14*a* and 14*b* arranged such that they are connected in series. The resistance resulting from the two resistive blocks 14 is about 2.24 milliohms.

The power supply 10 further comprises capacitance filters 12 connected in parallel to one another and in parallel to the rectifier 11, the capacitance filters 12 being configured for filtering or smoothing out ripple, resulting in a direct current whose voltage would virtually not vary over time. The power supply 10 further comprises a diode 13 connected in parallel to the rectifier 11 and to the capacitance filters 12. In a preferred embodiment, the rectifier 11 is a diode bridge.

Moreover, the first input terminal 22 and the second input terminal 23 of the power supply 10 are configured for being connected with the external energy source 8, providing a form-fitting connection with the external energy source 8. This form-fitting connection is a simple and quick assembly/disassembly connection. In a preferred embodiment, the first input terminal 22 and the second input terminal 23 of the main current circuit 1 are configured for being connected, providing a male-female attachment.

Figure 2:
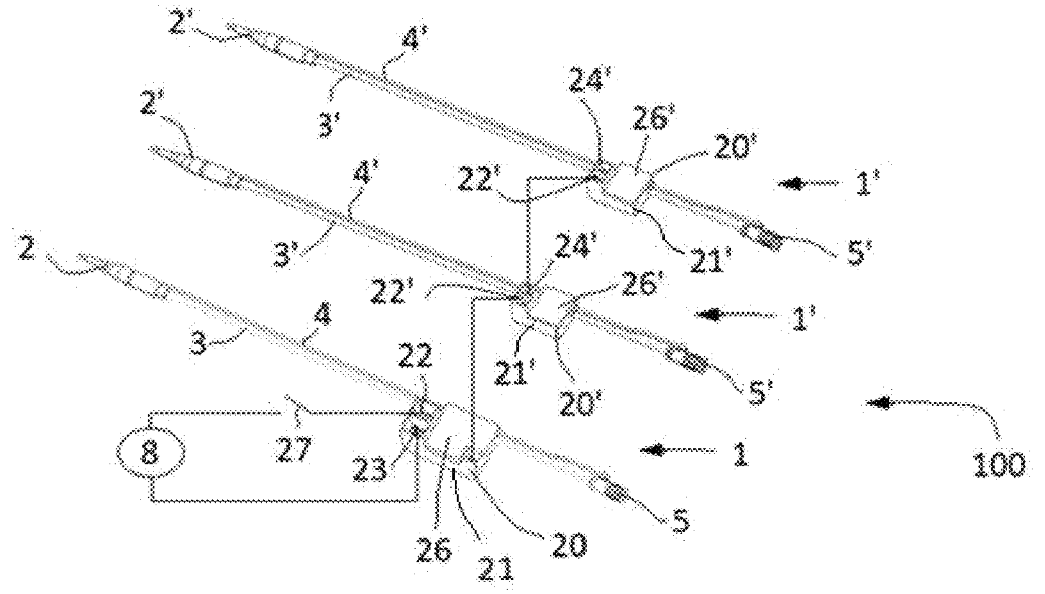
FIG. 2 shows a perspective view of the thermoelectric assembly schematically shown in FIG. 1.
Figure 3:
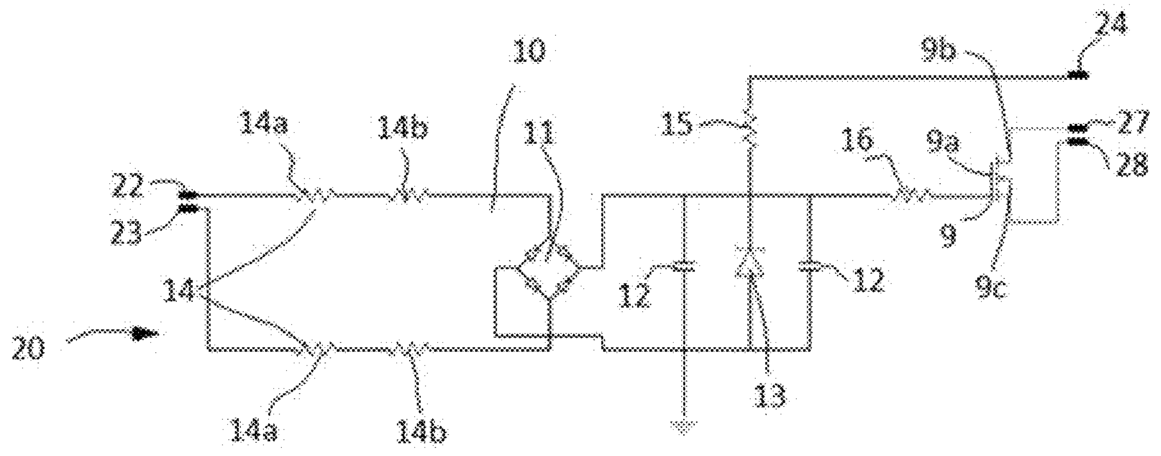
FIG. 3 shows a detailed view of the wiring diagram of a connection module of the main current circuit shown in FIG. 1.

The connection module 20 of the main current circuit 1, shown in FIG. 2, comprises a body 21 inside which there is housed the power supply 10 and the transistor 9, with the input terminals 22 and 23 projecting from the body 21. The body 21 is made of an insulating material and comprises a corresponding cover 26 which closes the housing where the power supply 10 and the transistor 9 are arranged.

In the embodiment shown in the drawings, the power supply 10 and the transistor 9 are assembled on a PCB (not depicted) housed inside the body 21.

The power supply 10 comprises an output terminal 24 projecting from the body 21. The input terminals 22 and 23 and the output terminal 24 project towards the outside orthogonal to the cover 26.

The connection module 20 of the main current circuit 1 may comprise an additional output terminal (not depicted) configured for connecting with a presence sensor for detecting the presence of utensils associated with the corresponding burner. The additional output terminal will provide a form-fitting connection with the corresponding presence sensor.

The main current circuit 1 further comprises a discharge resistor 15 of the transistor, the discharge resistor 15 being connected in parallel to the transistor 9, the discharge resistor 15 assuring the opening of the transistor 9 when the transistor 9 is no longer powered by the power supply 10. The discharge resistor 15 is arranged such that it is housed in the body 21 of the connection module 20. In particular, the discharge resistor 15 is assembled on the PCB together with the transistor 9 and the power supply 10.

The main current circuit 1 also comprises a safety resistor 16 connected in series with the port 9*a* of the transistor 9. The safety resistor 16 limits the current that would go to the main current circuit 1 from the power supply 10 in the event of a short-circuit failure of the transistor 9. The discharge resistor 16 is arranged such that it is housed in the body 21 of the connection module 20. In particular, the discharge resistor 16 is assembled on the PCB together with the transistor 9 and the power supply 10.

Moreover, an electromechanical switch 27 is arranged between the power supply 10 and the external power supply 8.

In other embodiments not shown in the drawings, the switch 27 can be connected between the power supply 10 and the transistor 9. In that case, the connection module 20 houses the switch 27 in the body 21. In one embodiment, the switch 27 is assembled on the PCB housed inside the body 21.

In both cases, when the switch 27 is closed and the power supply 10 is connected to the external energy source 8, the power supply 10 powers the transistor 9 such that the transistor 9 allows current to pass therethrough. With the switch 27 closed, if the thermocouple 2 detects the presence of flame, it will generate a thermoelectric current that goes through the transistor 9 keeping the electromagnetic valve 6 such that it allows the passage of gas to the burner. When the thermocouple 2 does not detect any flame, and therefore no longer generate the thermoelectric current required for keeping the electromagnetic valve 6 energized, the electromagnetic valve 6 closes the passage of gas. When the corresponding signal is sent to the switch 27 from a non-depicted control so as to open the switch 27, the transistor 9 is not powered, so it acts like an open switch, not allowing current to go from the thermocouple 2 to the electromagnetic valve 6, the passage of gas is thereby closed. The transistor 9 therefore allows acting on the electromagnetic valve 6 de-energizing it when a previously defined parameter is achieved, the parameter not being the presence of flame in the burner 2.

The thermoelectric assembly 100 further comprises at least one additional current circuit 1' associated with a respective electromagnetic valve 6', the additional current circuit 1' being able to be connected to the main current circuit 1. In the embodiment shown in the drawings, the thermoelectric assembly 100 comprises two additional current circuits 1', each of them associated with a respective electromagnetic valve 6'. Regardless of whether the thermoelectric assembly 100 includes one, two, or a plurality of additional current circuits, the features of each additional current circuit are similar and will be described below.

Each additional current circuit 1' comprises a thermocouple 2' configured for detecting flame in the corresponding burner, cables 3' and 4' connected to the corresponding thermocouple 2' and configured for electrically connecting the thermocouple 2' with the corresponding electromagnetic valve 6' through a connector 5', and a transistor 9' connected to the corresponding cable 3' and configured for de-energizing the electromagnetic valve 6' to which it is connected.

Each transistor 9' of the respective additional current circuit 1' has the same features and operates in the same manner as the transistor 9 of the main current circuit 1, so what has been described above is applicable to the transistors of the additional current circuits. The features of the thermocouple 2' of each additional current circuit 1' are similar to those of thermocouple 2. Similarly, the features of the cables 3' and 4' for connecting the thermocouple 2' to the electromagnetic valve 6' in the additional current circuit 1' are similar to those of the cables 3 and 4 of the main current circuit 1, so what is described above in relation to these elements for the main current circuit is applicable to the additional current circuits.

Figure 4:
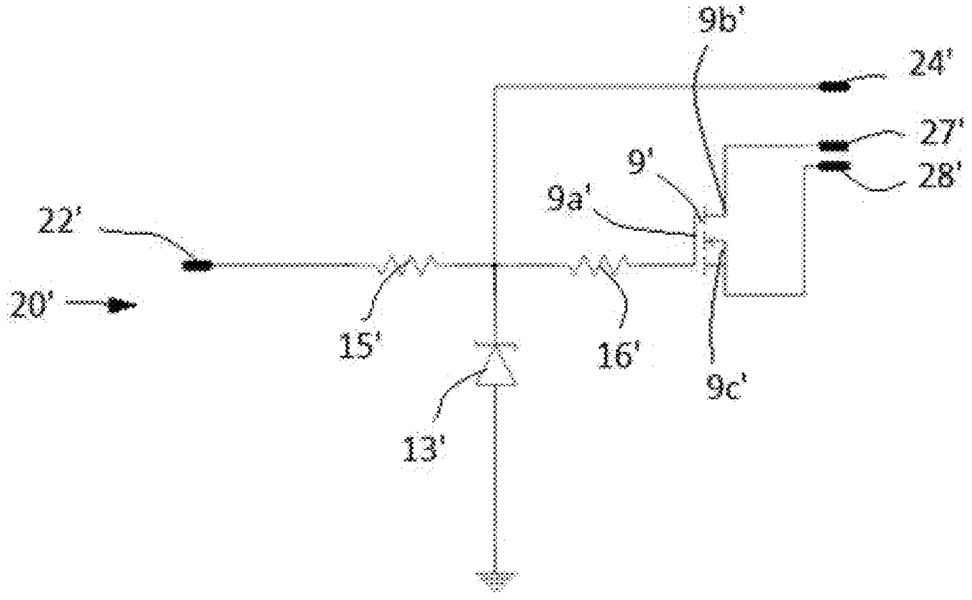
FIG. 4 shows a detailed view of a connection module of the additional current circuit shown in FIG. 1.

Each additional current circuit 1' comprises a connection module 20' housing the corresponding transistor 9', each connection module 20' comprising an input terminal 22' connected to the corresponding transistor 9'. In particular, the input terminal 22' is connected to the port 9*a*' of the respective transistor 9'. The connection module 20' of each additional current circuit 1', shown in FIGS. 2 and 4, comprises an output terminal 24'. Each input terminal 22' of the corresponding additional current circuit 1' is configured for being connected to the output terminal 24 of the connection module 20 of the main current circuit 1 or to the output terminal 24' of another connection module 20' of the additional current circuit 1'.

In the embodiment shown in the drawings, one of the additional current circuits 1' (hereinafter, first additional current circuit 1') is connected to the main current circuit 1 through respective connection modules 20 and 20'. In particular, the input terminal 22' of the connection module 20' of the first additional current circuit 1' is connected to the output terminal 24 of the main current circuit 1 as shown in FIG. 2. Furthermore, both additional current circuits 1' and 1" are connected to one another through respective connection modules 20'. In particular, the input terminal 22' of the connection module 20' of another additional current circuit 1" (hereinafter, second additional current circuit 1") is connected to the output terminal 24' of the connection module 20' of the first additional current circuit 1'.

The output terminal 24 of the connection module 20 of the main current circuit 1 and the input terminal 22' of the connection module 20' of an additional current circuit 1' are configured for being connected, providing a form-fitting connection. This form-fitting connection is a simple and quick assembly/disassembly connection. In a preferred embodiment, the output terminal 24 of the connection module 20 of the main current circuit 1 and the input terminal 22' of the connection module 20' of the first additional current circuit 1' are configured for being connected, providing a male-female attachment.

Moreover, the output terminal 24' of the connection module 20' of the first additional current circuit 1' and the input terminal 22' of the connection module 20' of the second additional current circuit 1' are configured for being connected, providing a form-fitting connection. This form-fitting connection is a simple and quick assembly/disassembly connection. In a preferred embodiment, the output terminal 24' of the connection module 20' of the first additional current circuit 1 and the input terminal 22' of the connection module 20' of the second additional current circuit 1' are configured for being connected, providing a male-female attachment.

The connection module 20' of each additional current circuit 1' comprises a body 21' inside which there is housed the respective transistor 9', with the input terminal 22' and the respective output terminal 24' projecting towards the outside of the respective body 21'. Each body 21' is made of an insulating material. Each body 21' comprises a corresponding cover 26' which closes the corresponding housing. In the embodiment shown in the drawings, the input terminal 22' and the output terminal 24' of the connection module 20' of the corresponding additional current circuit 1' project towards the outside orthogonal to the cover 26'.

The connection module 20' of each additional current circuit 1' may comprise an additional output terminal (not depicted) configured for connecting with a presence sensor for detecting the presence of utensils associated with the corresponding burner. The additional output terminal will provide a form-fitting connection with the corresponding presence sensor.

Each additional current circuit 1' further comprises a discharge resistor 15' of the transistor 9', the discharge resistor 15' being connected in parallel to the transistor 9' and configured for assuring the opening of the transistor 9' when the transistor 9' is no longer powered by the power supply 10. The discharge resistor 15' is arranged such that it is housed in the body 21' of the connection module 20'. In particular, the discharge resistor 15' is assembled on the PCB together with the transistor 9'.

Each additional current circuit 1' comprises a safety resistor 16 connected in series with the port 9*a*' of the transistor 9' and configured for limiting the current that would go to the additional current circuit 1' from the power supply 10 in the event of a short-circuit failure of the corresponding transistor 9'. The discharge resistor 16' is arranged such that it is housed in the body 21' of the respective connection module 20'. In particular, the discharge resistor 16' is assembled on the PCB together with the respective transistor 9'.

Each additional current circuit 1' further comprises a diode 13' connected between the discharge resistor 15' and the safety resistor 16, and in parallel to the transistor 9'.

In the embodiment shown in the drawings, the output terminal 24' of the connection module 20' of the corresponding additional current circuit 1' is connected between the discharge resistor 15' of the additional current circuit 1' and the safety resistor 16' of the respective additional current circuit 1'.

In other embodiments that are not shown, the thermoelectric assembly may comprise a single additional current circuit or a plurality of additional current circuits that can be connected to one another through respective connection modules, the single additional current circuit or a circuit of the plurality of additional current circuits being arranged such that it is connected to the main current circuit. A thermoelectric assembly in which the circuits associated with the thermocouples can be quickly coupled to one another is thereby obtained, with the power supply being integrated in one of the circuits. A modular solution that can be scaled according to needs and readily detachable from one another is thereby provided. The features of the single additional current circuit or of each of the additional current circuits of the plurality of additional current circuits are those described for the two additional current circuits of the embodiment shown in the drawings.

The thermoelectric assembly 100 operates in the following manner, when the switch 27 is closed and the main current circuit 1 connected to the external energy source 8, the power supply 10 powers the transistors 9 and 9' of the main current circuit 1 and of the respective additional current circuits 1', the transistors 9 and 9' acting like closed switches allowing the thermoelectric current which is generated in the respective thermocouple 2 and 2' when there is flame in the corresponding burner to energize the respective electromagnetic valve 6 and 6'. When a parameter whereby it is considered necessary to close the passage of gas to one of the burners in particular is detected, the switch 27 opens such that the transistors 9 and 9' of the main current circuit 1 and of the additional current circuits 1' are not powered and act like open switches, the corresponding electromagnetic valve 6 and 6' being de-energized.

The following clauses disclose in an unlimited way additional embodiments.

Clause 1. A thermoelectric assembly for powering a plurality of electromagnetic valves 6, 6' of a cooking appliance, each electromagnetic valve 6, 6' being configured for closing the passage of gas to a corresponding burner of the cooking appliance, the thermoelectric assembly 100 comprising a main current circuit 1 associated with a respective electromagnetic valve 6, the main current circuit 1 comprising a thermocouple 2 configured for detecting flame in the corresponding burner, a cable 3 connected to the thermocouple 2 and configured for electrically connecting the thermocouple 2 with the corresponding electromagnetic valve 6, and a transistor 9 connected to the cable 3 and configured for de-energizing the electromagnetic valve 6, the main current circuit 1 comprises a connection module 20 comprising a power supply 10 connected to the transistor 9, the power supply 10 comprising input terminals 22, 23 configured for being connected to an external energy source 8, a rectifier 11 configured for transforming the alternating current of the external energy source 8 into direct current, and a resistive block 14 connected between one of the input terminals 22, 23 and the rectifier 11, the resistive block 14 replacing a transformer and being configured for minimizing the current circulating through the power supply 10 to a value equivalent to the galvanic isolation that otherwise would have been provided by the transformer.

Clause 2. The thermoelectric assembly according to the preceding clause, wherein the resistive block 14 comprises at least two resistors 14*a*, 14*b* arranged such that they are connected in series.

Clause 3. The thermoelectric assembly according to any of the preceding clauses, wherein the power supply 10 comprises two resistive blocks 14, each of them connected to the corresponding input terminal 22, 23.

Clause 4. The thermoelectric assembly according to clause 1 or 2, wherein the resistance of the resistive block 14 is about 2.24 milliohms.

Clause 5. The thermoelectric assembly according to clause 3, wherein the resistance of the two resistive blocks 14 is about 2.24 milliohms.

Clause 6. The thermoelectric assembly according to any of the preceding clauses, wherein the first input terminal 22 and the second input terminal 23 are configured for being connected, providing a form-fitting connection with the external energy source 8.

Clause 7. The thermoelectric assembly according to any of the preceding clauses, wherein the connection module 20 comprises a body 21 inside which there is housed the power supply 10 and the transistor 9, with the input terminals 22, 23 and an output terminal 24 projecting from the body 21.

Clause 8. The thermoelectric assembly according to clause 7, wherein the connection module 20 comprises an additional output terminal configured for connecting with a presence sensor for detecting the presence of utensils associated with the corresponding burner.

Clause 9. The thermoelectric assembly according to clause 7 or 8, comprising an additional current circuit 1' associated with a respective electromagnetic valve 6', the additional current circuit Clause 1' comprising a thermocouple 2' configured for detecting flame in the corresponding burner, a cable 3' connected to the thermocouple 2' and configured for electrically connecting the thermocouple 2' with the corresponding electromagnetic valve 6', and a transistor 9' connected to the cable 3' and configured for de-energizing the electromagnetic valve 6' to which it is connected, the additional current circuit 1' comprising a connection module 20' housing the corresponding transistor 9', the connection module 20' comprising an input terminal 22' connected to the transistor 9' and configured for being connected to the output terminal 24 of the connection module 20 of the main current circuit 1.

Clause 10. The thermoelectric assembly according to the preceding clause, wherein the output terminal 24 of the connection module 20 of the main current circuit 1 and the input terminal 22' of the connection module 20' of the additional current circuit 1' are configured for being connected, providing a form-fitting connection.

Clause 11. The thermoelectric assembly according to clause 9 or 10, comprising a plurality of additional current circuits 1' each of them associated with a respective electromagnetic valve 6', each additional current circuit 1' being configured for being connected with another additional current circuit 1' through respective connection modules 20' of each additional current circuit 1', such that the input terminal 22' of the connection module 20' of one of the additional current circuits 1' and the output terminal 24' of the connection module 20' of another additional current circuit 1' are configured for being connected to one another, providing a form-fitting connection.

Clause 12. The thermoelectric assembly according to any of clauses 9 to 11, wherein the additional current circuit 1' comprises a discharge resistor 15' of the transistor 9' connected in parallel to the transistor 9' and configured for assuring the opening of the transistor 9' when the transistor 9' is no longer powered by the power supply 10.

Clause 13. The thermoelectric assembly according to any of clauses 9 to 12, wherein the additional current circuit 1' comprises a safety resistor 16' connected in series with the port 9*c'* of the transistor 9' and configured for limiting the current that would go to the additional current circuit 1' from the power supply 10 in the event of a short-circuit failure of the transistor 9'.

Clause 14. The thermoelectric assembly according to any of the preceding clauses, wherein the main current circuit 1 comprises a discharge resistor 15 of the transistor 9 connected in parallel to the transistor 9 and configured for assuring the opening of the transistor 9 when the transistor 9 is no longer powered by the power supply 10.

Clause 15. The thermoelectric assembly according to any of the preceding clauses, wherein the main current circuit 1 comprises a safety resistor 16 connected in series with the port 9*c* of the transistor 9 configured for limiting the current that would go to the main current circuit 1 from the power supply 10 in the event of a short-circuit failure of the transistor 9.

Clause 16. A thermoelectric assembly for powering a plurality of electromagnetic valves 6, 6' of a cooking appliance, each electromagnetic valve 6, 6' being configured for closing the passage of gas to a corresponding burner of the cooking appliance, the thermoelectric assembly 30 comprising a main current circuit 1 associated with a respective electromagnetic valve 6, the main current circuit 1 comprising a thermocouple 2 configured for detecting flame in the corresponding burner, a cable 3 connected to the thermocouple 2 and configured for electrically connecting said thermocouple 2 with the corresponding electromagnetic valve 6, and a transistor 9 connected to the cable 3 and configured for de-energizing the electromagnetic valve 6 when said transistor 9 is no longer powered, and at least one additional current circuit 1' associated with a respective electromagnetic valve 6', the additional current circuit 1' comprising a thermocouple 2' configured for detecting flame in the corresponding burner, a cable 3' connected to the thermocouple 2' and configured for electrically connecting said thermocouple 2' with the corresponding electromagnetic valve 6', and a transistor 9' connected to the cable 3' and configured for de-energizing the electromagnetic valve 6' to which it is connected, the main current circuit 1 comprises a connection module 20 housing the transistor 9 and a power supply 10, and the additional current circuit 1' comprises a connection module 20' comprising the corresponding transistor 9', the connection module 20 of the main current circuit 1 and the connection module 20' of the additional current circuit 1' being configured for being connected such that the power supply 10 does not only power the transistor 9 of the main current circuit 1, but also the transistor 9' of the respective additional current circuit 1' when said power supply 10 is connected to an external energy source 8.

Clause 17. The thermoelectric assembly according to the preceding clause, wherein the power supply 10 comprises two input terminals 22, 23, the input terminals 22, 23 being configured for being connected to the external energy source 8 forming a form-fitting connection, and the connection module 20' of the additional current circuit 1' comprises an input terminal 22' configured for being connected with an output terminal 24 of the connection module 20 of the main current circuit 1 forming a form-fitting connection.

Clause 18. The thermoelectric assembly according to the preceding clause, wherein the connection module 20 of the main current circuit 1 comprises a body 21 inside which there is housed the power supply 10 and the transistor 9, with the input terminals 22, 23 and the output terminal 24 projecting towards the outside of the body 21.

Clause 19. The thermoelectric assembly according to the preceding clause, wherein the power supply 10 and the transistor 9 of the main current circuit 1 are assembled on a PCB housed in the body 21.

Clause 20. The thermoelectric assembly according to any of clauses 17 to 19, comprising a plurality of additional thermoelectric current circuits 1' each of them associated with a respective electromagnetic valve 6', each additional current circuit 1' being configured for being connected with another additional current circuit 1' through respective connection modules 20' of each additional current circuit 1', each connection module 20' of the additional current circuit 1' comprising an output terminal 24', such that the input terminal 22' of the connection module 20' of one of the additional thermoelectric current circuits 1' and the output terminal 24' of the connection module 20' of another additional current circuit 1' are configured for being connected, providing a form-fitting connection.

Clause 21. The thermoelectric assembly according to the preceding clause, wherein each connection module 20' of the additional current circuit 1' comprises a body 21' inside which there is housed the corresponding transistor 9', with the input terminal 22' and the respective output terminal 24' projecting towards the outside of the body 21'.

Clause 22. The thermoelectric assembly according to clause 20 or 21, wherein the connection module 20' of the corresponding additional current circuit 1' comprises an additional output terminal configured for being connected with a presence sensor for detecting the presence of utensils associated with the corresponding burner.

Clause 23. The thermoelectric assembly according to any of clauses 17 to 22, wherein the connection module 20 of the main current circuit 1 comprises an additional output terminal configured for connecting with a presence sensor for detecting the presence of utensils associated with the corresponding burner.

Clause 24. The thermoelectric assembly according to any of clauses 17 to 23, wherein the power supply 10 comprises a rectifier 11 configured for transforming the alternating current of the energy source 8 into direct current, and a resistive block 14 connected between at least one input terminal 22, 23 of the power supply 10 and the rectifier 11 and configured for minimizing the current circulating through the power supply 10 to a value equivalent to the galvanic isolation.

Clause 25. The thermoelectric assembly according to the preceding clause, wherein the power supply 10 comprises two resistive blocks 14, each of them connected to the corresponding input terminal 22, 23 of the power supply 10.

Clause 26. The thermoelectric assembly according to clause 24 or 25, wherein the resistive block 14 comprises at least two resistors 14*a*, 14*b* arranged such that they are connected in series.

Clause 27. The thermoelectric assembly according to any of clauses 16 to 26, wherein the main current circuit 1 and each additional current circuit 1', respectively, comprise a discharge resistor 15, 15' of the transistor 9, 9' connected in parallel to the respective transistor 9, 9' and configured for assuring the opening of the transistor 9, 9' when the voltage supplied to the port 9*c*, 9*c'* of the transistor 9, 9' is eliminated.

Clause 28. The thermoelectric assembly according to any of clauses 16 to 27, wherein the main current circuit 1 and each additional current circuit 1', respectively, comprise a safety resistor 16, 16' connected in series with the port 9*c*, 9*c'* of the transistor 9, 9' and configured for limiting the current that would go to the corresponding current circuit 1, 1' from the power supply 10 in the event of a short-circuit failure of the transistor 9, 9'.

What is claimed is:

1. A thermoelectric assembly for powering a first electromagnetic valve of a cooking appliance, the first electromagnetic valve being configured to close a passage of gas to a first burner of the cooking appliance, the thermoelectric assembly comprising:

- a main current circuit associated with the first electromagnetic valve, the main current circuit comprising:
  - a thermocouple configured to detect a flame in the first burner;
  - a cable connected to the thermocouple and configured to electrically connect the thermocouple with the first electromagnetic valve;
  - a transistor electrically connected to the cable and configured to de-energize the first electromagnetic valve;
  - a first connection module including a power supply connected to the transistor, the power supply comprising:
    - first and second input terminals configured to be connected to an external energy source;
    - a rectifier configured to transform an alternating current of the external energy source into direct current; and
    - a first resistive block connected between the first input terminal and the rectifier, the resistive block being configured to minimize the current circulating through the power supply,
  - wherein the power supply includes a second resistive block connected between the second input terminal and the rectifier.

2. The thermoelectric assembly according to claim 1, wherein the first resistive block includes at least two resistors connected in series.

3. The thermoelectric assembly according claim 1, wherein each of the first and second resistive blocks includes at least two resistors connected in series.

4. The thermoelectric assembly according to claim 1, wherein each of the first and second input terminals is configured to be connected to the external energy source by a quick assembly/disassembly connection.

5. The thermoelectric assembly according to claim 1, wherein the first connection module includes a body inside which there is housed the power supply and the transistor, each of the first and second input terminals and an output terminal projects from the body.

6. The thermoelectric assembly according to claim 1, wherein the main current circuit includes a discharge resistor of the transistor of the main current circuit connected in parallel to the transistor of the main current circuit and configured to cause an opening of the transistor of the main current circuit when the transistor of the main current circuit is no longer powered by the power supply.

7. The thermoelectric assembly according to claim 1, wherein the main current circuit includes a safety resistor connected in series with a port of the transistor of the main current circuit, the safety resistor configured to limit a current to the main current circuit from the power supply in the event of a short-circuit failure of the transistor of the main current circuit.

8. The thermoelectric assembly according to claim 6, wherein the main current circuit includes a safety resistor connected in series with a port of the transistor of the main current circuit, the safety resistor configured to limit a current to the main current circuit from the power supply in the event of a short-circuit failure of the transistor of the main current circuit.

9. The thermoelectric assembly according to claim 8, wherein the first resistive block includes at least two resistors connected in series.

10. The thermoelectric assembly according to claim 1, further comprising first and second capacitance filters electrically connected in parallel to one another and in parallel to the rectifier.

11. A thermoelectric assembly for powering a first electromagnetic valve of a cooking appliance, the first electromagnetic valve being configured to close a passage of gas to a first burner of the cooking appliance, the thermoelectric assembly comprising:
- a main current circuit associated with the first electromagnetic valve, the main current circuit comprising:
  - a thermocouple configured to detect a flame in the first burner;
  - a cable connected to the thermocouple and configured to electrically connect the thermocouple with the first electromagnetic valve;
  - a transistor electrically connected to the cable and configured to de-energize the first electromagnetic valve;
  - a first connection module including a power supply connected to the transistor, the power supply comprising:
    - first and second input terminals configured to be connected to an external energy source;
    - a rectifier configured to transform an alternating current of the external energy source into direct current; and
    - a first resistive block connected between the first input terminal and the rectifier, the resistive block being configured to minimize the current circulating through the power supply;
- wherein the first connection module includes a body inside which there is housed the power supply and the transistor, each of the first and second input terminals and an output terminal projects from the body.

12. The thermoelectric assembly according to claim 11, wherein the power supply includes a second resistive block connected between the second input terminal and the rectifier.

13. A thermoelectric assembly for powering a first electromagnetic valve of a cooking appliance, the first electromagnetic valve being configured to close a passage of gas to a first burner of the cooking appliance, the thermoelectric assembly comprising:
- a main current circuit associated with the first electromagnetic valve, the main current circuit comprising:
  - a thermocouple configured to detect a flame in the first burner;
  - a cable connected to the thermocouple and configured to electrically connect the thermocouple with the first electromagnetic valve;
  - a transistor electrically connected to the cable and configured to de-energize the first electromagnetic valve;
  - a connection module including a power supply connected to the transistor, the power supply comprising:
    - first and second input terminals configured to be connected to an external energy source;
    - a rectifier configured to transform an alternating current of the external energy source into direct current; and
    - a first resistive block connected between the first input terminal and the rectifier, the resistive block being configured to minimize the current circulating through the power supply;
- wherein the main current circuit includes a discharge resistor of the transistor of the main current circuit connected in parallel to the transistor of the main current circuit and configured to cause an opening of the transistor of the main current circuit when the transistor of the main current circuit is no longer powered by the power supply.

14. The thermoelectric assembly according to claim 11, wherein the first connection module includes an additional output terminal configured to connect with a presence sensor that detects the presence of utensils associated with the burner.

15. The thermoelectric assembly according to claim 11, further comprising a first additional current circuit associated with a second electromagnetic valve of the cooking appliance, the second electromagnetic valve being configured to close a passage of gas to a second burner of the cooking appliance, the first additional current circuit comprising;
- a thermocouple configured to detect a flame in the second burner;
- a cable connected to the thermocouple of the first additional current circuit and configured to electrically connect the thermocouple of the first additional current circuit with the second electromagnetic valve;
- a transistor connected to the cable of the first additional current circuit and configured to de-energize the second electromagnetic valve;
- a second connection module housing the transistor of the first additional current circuit, the second connection module of the first additional current circuit including an input terminal connected to the transistor of the first additional current circuit and configured to be connected to the output terminal of the first connection module of the main current circuit.

16. The thermoelectric assembly according to the claim 15, wherein the output terminal of the first connection module of the main current circuit and the input terminal of the second connection module of the first additional current circuit are configured to be connected to provide a quick assembly/disassembly connection.

17. The thermoelectric assembly according to claim 15, further comprising a second additional current circuit associated with a third electromagnetic valve of the cooking appliance, the second additional current circuit being configured to be connected with the first additional current circuit through a connection module of the second additional current circuit, such that an input terminal of the connection module of the second additional current circuit and the output terminal of the second connection module of the first additional current circuit are configured to be connected to one another by a quick assembly/disassembly connection.

18. The thermoelectric assembly according to claim 15, wherein the first additional current circuit includes a discharge resistor of the transistor of the first additional current circuit, the discharge resistor being connected in parallel to the transistor of the first additional current circuit and configured to cause an opening of the transistor of the first additional current circuit when the transistor of the first additional current circuit is no longer powered by the power supply.

19. The thermoelectric assembly according to claim 15, wherein the first additional current circuit includes a safety resistor connected in series with a port of the transistor of the first additional current circuit, the safety resistor being configured to limit current flow through the first additional current circuit that would flow to the first additional current circuit from the power supply in the event of a short-circuit failure of the transistor of the first additional current circuit.

20. The thermoelectric assembly according to claim 18, wherein the first additional current circuit includes a safety resistor connected in series with a port of the transistor of the first additional current circuit, the safety resistor being configured to limit current flow through the first additional current circuit that would flow to the first additional current circuit from the power supply in the event of a short-circuit failure of the transistor of the first additional current circuit.

* * * * *